United States Patent [19]

Izzo et al.

[11] Patent Number: 5,770,254

[45] Date of Patent: *Jun. 23, 1998

[54] REDUCED-FAT COMPOSITIONS AND METHODS FOR PREPARING AND USING SAME

[75] Inventors: Henry J. Izzo, Bridgewater; Robert E. Lieberman, Morris Township, both of N.J.

[73] Assignee: Healthy Foods Solutions, Inc., Morris Township, N.J.

[*] Notice: The term of this patent shall not extend beyond the expiration date of Pat. No. 5,240,734.

[21] Appl. No.: 567,488

[22] Filed: Dec. 5, 1995

Related U.S. Application Data

[63] Continuation-in-part of Ser. No. 327,486, Oct. 21, 1994, Pat. No. 5,560,955.

[51] Int. Cl.⁶ .................................................... A23L 1/38
[52] U.S. Cl. ........................ 426/633; 426/654; 426/656; 426/657; 426/804
[58] Field of Search .................................... 426/633, 654, 426/656, 657, 804

[56] References Cited

U.S. PATENT DOCUMENTS

| | | | |
|---|---|---|---|
| 5,082,684 | 1/1992 | Fung | 426/603 |
| 5,308,639 | 5/1994 | Fung | 426/603 |
| 5,532,020 | 7/1996 | Silver | 426/603 |

FOREIGN PATENT DOCUMENTS

| | | |
|---|---|---|
| 1118606 | 7/1968 | United Kingdom . |
| 2196523 | 5/1988 | United Kingdom . |

*Primary Examiner*—Helen Pratt
*Attorney, Agent, or Firm*—Richard R. Muccino

[57] ABSTRACT

This invention pertains to reduced-fat compositions in the form of an emulsion which comprises in percentages by weight of the total composition (A) an oil phase comprising an edible fat or oil present in an amount from about 1% to about 99%; and (B) an aqueous phase present in an amount from about 1% to about 99%, wherein the aqueous phase comprises a protein complexing agent present in an amount from about 0.2% to about 98%. The reduced-fat compositions may be used directly or may be incorporated in effective amounts into edible carriers to provide a wide variety of edible compositions. This invention also pertains to methods for preparing and using these reduced-fat compositions and the edible compositions in which they may be employed.

24 Claims, No Drawings

REDUCED-FAT COMPOSITIONS AND METHODS FOR PREPARING AND USING SAME

This application is a continuation-in-part of application Ser. No. 08/327,486, filed 21 Oct., 1994, now U.S. Pat. No. 5,560,955.

BACKGROUND OF THE INVENTION

1. Field of the Invention

This invention pertains to improved reduced-fat compositions comprising a protein complexing agent. More particularly, this invention pertains to reduced-fat compositions in the form of an emulsion which comprises in percentages by weight of the total composition (A) an oil phase comprising an edible fat or oil present in an amount from about 1% to about 99%; and (B) an aqueous phase present in an amount from about 1% to about 99%, wherein the aqueous phase comprises a protein complexing agent present in an amount from about 0.2% to about 98%. The reduced-fat compositions may be used directly or may be incorporated in effective amounts into edible carriers to provide a wide variety of edible compositions. This invention also pertains to methods for preparing and using these reduced-fat compositions and the edible compositions in which they may be employed.

2. Description of the Background

Reduced-fat food products are in great demand by consumers. Reduced-fat food products such as reduced-fat butter, margarine, and shortening are generally prepared by replacing fat with an aqueous carbohydrate or protein solution. A problem in the field of reduced-fat baked foods is that water from the aqueous carbohydrate or protein solution of the reduced-fat food product tends to be absorbed by protein in the cereal or flour portion of the baked food. This migration of water to the protein causes the protein to become excessively hydrated and the carbohydrate solution to become concentrated resulting in a finished baked food having a gummy, mealy, or chewy texture. In addition, rapid loss of water from the hydrated protein during baking causes excessive shrinking, cracking, and poor crumb structure in the reduced-fat baked food product. Consequently, conventional reduced-fat butters, margarines, and shortenings cannot be used for baking.

U.S. Pat. No. 4,863,753, issued to Hunter et al., discloses a reduced-calorie peanut butter composition in which a portion of the peanut oil is replaced by triglycerides containing medium chain fatty acids.

U.S. Pat. No. 4,814,195, issued to Yokoyama et al., discloses a reduced-calorie peanut butter composition containing from about 15% to about 40% of a low-calorie solid bulking agent such as polydextrose or microcrystalline cellulose.

U.S. Pat. No. 4,228,190, issued to Wallgren et al., discloses a margarine composition in the form of a water-in-oil emulsion which comprises a fat phase present in an amount from about 35% to about 65% and an aqueous precipitated protein phase, present in an amount from about 35% to about 65%. Wallgren et al. forms the aqueous precipitated protein phase by coagulating milk protein with rennet and the calcium already present in casein. Wallgren et al. does not teach to add a protein complexing agent.

U.S. Pat. No. 3,580,729, issued to Darragh et al., discloses a peanut spread supplemented with from about 15% to about 25% of soybean protein and from about 15% to about 25% of liquid vegetable oil.

U.S. Pat. No. 3,552,980, issued to Cooper et al., discloses a spreadable food product consisting of two discrete spreads in contact with each other. One spread is hydrophilic such as a peanut butter and the other spread is a modified sweet aqueous spread such as a jelly. The sweet aqueous spread is modified to contain in the non-aqueous portion less than 50% carbohydrates having a molecular weight of less than about 200 to prevent migration of moisture from the sweet aqueous spread to the hydrophilic spread.

U.S. Pat. No. 2,388,991, issued to Oatman, discloses a method for precipitating casein from dried skim milk which consists of mixing the dried skim milk with fresh skim milk and precipitating the casein with an acid, sour whey, or rennet.

U.S. Pat. No. 5,273,773, issued to Katayama et al., discloses a protein partial degradation product obtained from a grain protein such as wheat protein, corn protein, and soya bean protein by specific degradation procedures. Katayama et al. states that the protein partial degradation products are useful as foodstuffs such as surface active agents.

While the above references disclose a variety of improved food compositions, none of the above disclosures has solved the difficulty in preparing a reduced-fat food product such as butter, margarine, or shortening suitable for use in baking. Thus it would be commercially advantageous to provide reduced-fat food products suitable for use in baking to facilitate the processing of these foods. The present invention provides such improved reduced-fat food products without the disadvantages characteristic of previously known products. This invention also pertains to methods for preparing and using these reduced-fat food products and the edible compositions in which they may be employed.

SUMMARY OF THE INVENTION

This invention pertains to a reduced-fat composition in the form of an emulsion which comprises in percentages by weight of the total composition:

(A) an oil phase comprising an edible fat or oil present in an amount from about 1% to about 99%; and (B) an aqueous phase present in an amount from about 1% to about 99%, wherein the aqueous phase comprises a protein complexing agent present in an amount from about 0.2% to about 98%.

In another embodiment, this invention pertains to a method for preparing a reduced-fat composition in the form of an emulsion which comprises the steps of:

(A) forming an aqueous phase present in an amount from about 1% to about 99%, wherein the aqueous phase comprises a protein complexing agent present in an amount from about 0.2% to about 98%, in percentages by weight; and (B) admixing the aqueous phase from step (A) with an oil phase comprising an edible fat or oil present in an amount from about 1% to about 99%, in percentages by weight, to form the reduced-fat composition.

In yet another embodiment, this invention pertains to a method for reducing the hygroscopic properties of a protein which comprises contacting a hygroscopic protein with a reduced-fat composition in the form of an emulsion, wherein the reduced-fat composition comprises:

(A) an oil phase comprising an edible fat or oil present in an amount from about 1% to about 99%; and (B) an aqueous phase present in an amount from about 1% to about 99%, wherein the aqueous phase comprises a protein complexing agent present in an amount from about 0.2% to about 98%.

In still yet another embodiment, this invention pertains to a method for reducing the hygroscopic properties of a protein which comprises contacting a hygroscopic protein with an effective amount of a protein complexing agent to reduce the hygroscopic properties of the protein.

In still yet another embodiment, this invention pertains to a delivery system for reducing the hygroscopic properties of a protein which comprises (a) a protein complexing agent to reduce the hygroscopic properties of a protein present in an amount from about 0.2% to about 99%, by weight, and (b) an edible carrier.

The reduced-fat compositions may be used directly or may be incorporated in effective amounts into edible carriers to provide a wide variety of edible compositions. This invention also pertains to methods for preparing and using these reduced-fat compositions comprising a protein complexing agent and the edible compositions in which they may be employed.

DETAILED DESCRIPTION OF THE INVENTION

Applicants have found that when conventional reduced-fat food products such as butter, margarine, and shortening are employed in baking, water from the aqueous carbohydrate or protein solution in the reduced-fat food product migrates to hygroscopic proteins in the cereal or flour portion of the baking food resulting in the baked composition becoming gummy, mealy, chewy, and difficult to process. Moreover, rapid loss of water from the hydrated protein during baking causes excessive shrinking, cracking, and poor crumb structure in the reduced-fat baked food product. Applicants have discovered that the hygroscopic properties of the proteins in the cereal or flour portion of the baking food can be reduced by premixing the reduced-fat food product with a protein complexing agent. When reduced-fat food products premixed with a protein complexing agent according to the present invention are used in baking, the resulting baked products retain a smooth consistency, do not become lumpy, and are easier to handle. Applicants believe that when a protein complexing agent is premixed in a reduced-fat food product, the complexing agent complexes with the protein in the cereal or flour portion of the baking food causing a change in conformation of the protein which results in a decrease in hygroscopicity. This reduced hygroscopicity results in less bound water in foods such as cakes, cookies, and pie crusts, leading to baking compositions having improved consistency with a more tender, moist mouth feel. The reduced-fat products comprising a protein complexing agent may be in the form of an oil-in-water or water-in-oil emulsion that reacts with, and reduces the hygroscopic properties of, the proteins present in the cereal or flour portion of the baking food.

The reduced-fat baked product comprising a protein complexing agent also has a more tender mouth feel because the complexing agent occupies active sites on the protein helixes preventing the formation of stronger gels upon heat denaturation of the protein. This tender texture resembles the texture of a full-fat baked product in which the presence of extra fat interferes with the formation of a strong protein gel. The reduced-fat compositions comprising a protein complexing agent can be formulated to resemble existing full-fat butter, margarine, and shortening. The reduced-fat compositions comprising a protein complexing agent can be readily substituted for a full-fat product in recipes for cakes, cookies, or pie crusts. When a reduced-fat composition comprising a protein complexing agent is substituted for a full-fat product, the resulting cake, cookies, or pie crust bake to a quality either better than or equivalent to that obtained from a full-fat product, but at a reduced-fat level.

The reduced-fat compositions comprising a protein complexing agent also have other desirable cooking properties. For example, protein present in food to be shallow pan fried apparently reacts on any surface exposed causing the food to adhere to the hot frying pan or griddle. When a food is shallow pan fried with a reduced-fat composition of the present invention, the protein complexing agent in the reduced-fat composition complexes with the protein present in the food causing the protein to loose its ability to react with and adhere to the hot frying pan. The reduced-fat compositions of the present invention also help retard foaming during boiling. When an undenatured protein is boiled in a liquid sauce such as milk or cheese, the hygroscopic protein present in the food dissolves in the water resulting in a foaming liquid mixture that has a tendency to boil over. When a food is boiled with a reduced-fat composition of the present invention, the protein complexing agent in the reduced-fat composition complexes with the protein present in the food resulting in a liquid mixture that is less foamy.

In a preferred embodiment, a water-soluble solid such as corn syrup solids, maltodextrins, sugars, and the like, may be included in the reduced-fat composition to dissolve in, and raise the boiling point of, the free water present. Inclusion of a water-soluble solid in the reduced-fat composition is particularly desirable when the finished baked product has a relatively high moisture content, such as a cake or bread. The presence of the water-soluble solid in the reduced-fat product promotes a slow, more controlled rate of moisture evaporation resulting in more even rise, fewer steam holes, and less doming during baking. This controlled rate of moisture evaporation results in a reduced-fat baked product which more closely resembes a full-fat baked product.

In addition to being transfered in an emulsion, the protein complexing agents of the present invention can also be transported in carriers such as carbohydrates and fiber blends such as corn syrup solids, maltodextrins, starches, sugars, natural fibers, and cellulose derivatives. The protein complexing agents may also be employed in an aqueous carrier or in an oily carrier to react with, and reduce the hygroscopic properties of, food proteins.

Applicants define the terms "ingestible" and "edible" to include all materials and compositions which are used by or which perform a function in the body. These include materials and compositions which are adsorbed and those which are not absorbed as well as those which are digestible and non-digestible.

In accord with the present invention, a reduced-fat composition in the form of an emulsion may be prepared which is suitable for use in baking. The reduced-fat composition comprises (A) an oil phase comprising an edible fat or oil; and (B) an aqueous phase comprising a protein complexing agent. The presence of the protein complexing agent in the reduced-fat composition reduces the hygroscopic properties of the protein in the flour or cereal portion of the baking product.

The edible fats or oils useful in the oil phase of the reduced-fat composition of the present invention may be selected from a wide variety of materials. Preferably, the edible fats or oils have a melting point in the range from about −10° C. to about 100° C., preferably from about 10° C. to about 100° C., and more preferably from about 20° C. to about 100° C. The edible fats or oils may be selected from the group consisting of animal fats and oils (dairy, lard, tallow), vegetable oils, marine oils, synthetic oils, fatty acids, triglycerides, natural waxes, synthetic waxes, and the like, and mixtures thereof. Fatty acids are carboxylic acids derived from or contained in an animal or vegetable fat or oil. Fatty acids are composed of a chain of alkyl groups containing from 4 to 22 carbon atoms and are characterized by a terminal carboxyl group. Triglycerides are naturally occuring esters of a normal fatty acid and glycerol. Waxes are low-melting organic mixtures or compounds having a high molecular weight, are solid at room temperature and generally are similar in composition to fats and oils except that waxes contain no glycerides. Waxes may be hydrocarbons or esters of fatty acids and alcohols. Fatty acids and waxes are both classified as lipids.

Preferably, the edible vegetable oil is an oil which has a melting point in the range from about −7° C. to about 90° C., preferably from about 0° C. to about 80° C., and more preferably from about 15° C. to about 70° C. The vegetable oils useful in the present invention are selected from the group consisting of hard palm oil (mp. 58°–62° C.), partially hydrogenated castor oil (mp. 86°–88° C.), partially hydrogenated cotton seed oil (mp. 46°–48° C.), partially hydrogenated soybean oil (mp. 67°–70° C.), and blends of partially hydrogenated palm kern oil, partially hydrogenated cotton seed oil, and partially hydrogenated soybean seed oil (mp. 38°–40° C., such as Paramount fat C), and the like, and mixtures thereof. The above oils may also be used in a liquid state. Partially hydrogenated sunflower oil, partially hydrogenated safflower oil, partially hydrogenated canola oil, partially hydrogenated corn oil, partially hydrogenated peanut oil, and partially hydrogenated olive oil may also be used. Preferably, the edible vegetable oil is selected from the group consisting of liquid partially hydrogenated, fully hydrogenated, and interesterified vegetable oils.

Triglycerides useful in the present invention are selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, hydrogenated castor oil, hydrogenated corn oil, hydrogenated safflower oil, hydrogenated canola oil, and the like, and mixtures thereof. The above triglycerides may also be used in a liquid state. Fatty acids esterified with non-fat materials may also be employed.

Waxes useful in the present invention include natural waxes, such as animal waxes, vegetable waxes, and petroleum waxes (i.e., paraffin waxes, microcrystalline waxes, petrolatum waxes, mineral waxes), and synthetic waxes which are edible and have a melting point within the range from about 25° C. to about 100° C. Specific examples of useful waxes are spermaceti wax, carnauba wax, Japan wax, bayberry wax, flax wax, beeswax, Chinese wax, shellac wax, lanolin wax, sugarcane wax, candelilla wax, paraffin wax, microcrystalline wax, petrolatum wax, carbowax, and the like, and mixtures thereof. Mixtures of these waxes with the fatty acids set out above may also be used.

In one preferred embodiment, the edible fats and oils suitable for use in the oil phase of the reduced-fat composition are those fats and oils found in butter. Butter is a yellow to white fatty food obtained from cow's milk by churning the milk into a flocculate. Butter is used as a spread and as a cooking fat. Butter is a high-energy food, containing approximately 715 calories per 100 grams, and has substantial amounts of vitamins A and D, some calcium and phosphorus, and a small amount of protein. Most butter contains at least 80% fat, not more than 16% water, about 2% salt, and 1% milk curd. The fat present in butter consists largely of mixed triglycerides of fatty acids which vary with many factors, but is largely glycerides of oleic, stearic, and palmitic acids, with smaller amounts of the glycerides of butyric, caproic, caprilic, and capric acids. The color of butter is caused by carotene and other fat-soluble pigments contained in the fat.

In another preferred embodiment, the edible fats and oils suitable for use in the oil phase of the reduced-fat composition are those fats and oils found in margarine. Margarine is a food product made principally from one or more vegetable or animal fats or oils in which is dispersed an aqueous portion containing milk products, either solid or fluid, salt, and other ingredients such as flavoring agents, yellow food pigments, emulsifiers, preservatives, vitamins A and D, and butter. Margarine is used in cooking and as a spread. Nutritionally, margarine is primarily a source of food fuel, calories, and other nutritional factors. The edible fats used in margarine have varied widely, a trend having been from the animal fats predominant in the early use of margarine to the vegetable fats, principally cottonseed, soybean, peanut, and corn oils. During the late 1950s, an interest developed in the relation of polyunsaturated fats and oils to health and as a result, a shift was made to corn or safflower oil as the preferred fat ingredients of margarine.

The amount of edible fat or oil present in the oil phase of the reduced-fat compositions of the present invention is an effective amount. An effective amount of edible fat or oil is that amount of fat or oil necessary to provide satisfactory flavor and texture to the composition. The exact amount of edible fat or oil employed is subject to such factors as the exact type of fat or oil used in the mixture, the other ingredients in the composition, and the type of final product desired. The exact amount of edible fat or oil employed may be varied in order to obtain the result desired in the final product and such variations are within the capabilities of those skilled in the art without the need for undue experimentation. In a preferred embodiment, the edible fat or oil will be present in the reduced-fat composition in an amount from about 1% to about 99%, preferably from about 2% to about 85%, and more preferably from about 15% to about 65%, by weight.

The protein complexing agent present in the aqueous phase of the reduced-fat composition of the present invention is a compound which will complex with the hygroscopic protein, reduce the hygroscopicity of the protein, and enhance mixing of the protein. Preferably, the protein complexing agent is a divalent metal ion selected from the group consisting of non-toxic water-soluble calcium compounds and magnesium compounds. Suitable non-limiting examples of calcium and magnesium compounds include calcium chloride, calcium carbonate, calcium sulfate, calcium lactate, calcium oxalate, calcium gluconate, calcium propionate, magnesium chloride, magnesium carbonate, magnesium sulfate, magnesium lactate, magnesium oxalate, magnesium gluconate, magnesium propionate, magnesium oxide, magnesium hydroxide, and the like, and mixtures thereof. In a preferred embodiment, the protein complexing agent is a calcium compound selected from the group consisting of calcium gluconate, calcium lactate, calcium propionate, and mixtures thereof. In a more preferred embodiment, the calcium compound is calcium gluconate.

The amount of protein complexing agent present in the aqueous phase of the reduced-fat composition of the present invention is an effective amount. An effective amount of protein complexing agent is that amount of protein complexing agent necessary to reduce the hygroscopic properties of the protein. The exact amount of protein complexing agent employed is subject to such factors as the type of protein complexing agent used in the mixture, the hygroscopic protein to be complexed, the other ingredients in the composition, and the type of final product desired. The exact amount of protein complexing agent employed may be varied in order to obtain the result desired in the final product and such variations are within the capabilities of those skilled in the art without the need for undue experimentation. In a preferred embodiment, the protein complexing agent will be present in the reduced-fat composition in an amount from about 0.2% to about 98%, preferably from about 0.4% to about 45%, and more preferably from about 0.6% to about 30%, by weight.

In a preferred embodiment, a water-soluble solid such as corn syrup solids, maltodextrins, sugars, starches, and the like, may be included in the aqueous phase of the reduced-fat composition to dissolve in, and raise the boiling point of, the free water present. The water-soluble solid promotes a slow, more controlled rate of moisture evaporation resulting in a finished reduced-fat baked product which more closely resembles a full-fat baked product. Non-limiting examples of water-soluble solids are carbohydrates such as dextrose, sucrose, fructose, maltodextrins such as low DE (dextrose equivalence) maltodextrins, lactose, vegetable gums such as acacias, guar, karaya, polydextrose, and celluloses such as microcrystalline cellulose, methyl cellulose, and mixtures thereof. Preferred sources of sugar water-soluble solids are sugar syrups and corn syrup solids. Preferred sources of reduced-calorie water-soluble solids are polydextrose and microcrystalline cellulose.

The amount of water-soluble solid present in the aqueous phase of the reduced-fat composition of the present invention is an effective amount. An effective amount of water-soluble solid is that amount of water-soluble solid necessary to control the rate of moisture evaporation during baking and provide a satisfactory final baked food product. The exact amount of water-soluble solid employed is subject to such factors as the type of water-soluble solid used in the mixture, the type of edible fat or oil and protein complexing agent employed in the mixture, the hygroscopic protein, and the other ingredients in the composition, and the type of final product desired. The exact amount of water-soluble solid employed may be varied in order to obtain the result desired in the final product and such variations are within the capabilities of those skilled in the art without the need for undue experimentation. In a preferred embodiment, the water-soluble solid will be present in the reduced-fat composition in an amount from about 2% to about 75%, preferably from about 5% to about 50%, and more preferably from about 8% to about 35%, by weight.

The amount of water present in the aqueous phase of the reduced-fat composition of the present invention is an effective amount. An effective amount of water is that amount of water necessary to reduce the fat content of the reduced-fat composition. The exact amount of water employed is subject to such factors as the type of edible fat or oil employed in the mixture, the other ingredients in the composition, and the type of final product desired. The exact amount of water employed may be varied in order to obtain the result desired in the final product and such variations are within the capabilities of those skilled in the art without the need for undue experimentation. In a preferred embodiment, water will be present in the reduced-fat composition in an amount from about 1% to about 99%, preferably from about 10% to about 50%, and more preferably from about 14% to about 35%, by weight.

In another preferred embodiment, an emulsifying agent may optionally be employed in the reduced-fat composition of the present invention to help prevent separation of the phases during storage. Emulsifying agents (surfactants, wetting agents) are compounds which, inter alia, reduce interfacial tension between immiscible phases and help disperse immiscible components into a single stable system. Emulsifying agents useful in this invention include lecithin, acetylated monoglycerides (Cetodan-700), stearic acid, oleic acid, polyethylene glycol, glyceryl monostearate, lecithin, fatty acid monoglycerides (Dimodan-PVK), diglycerides, propylene glycol monostearate, Myverol 1892, and the like, and mixtures thereof. The preferred emulsifying agents are selected from the group consisting of glyceryl monostearate, acetylated monoglycerides (Cetodan-700), fatty acid monoglycerides (Dimodan-PVK), stearic acid, Myverol 1892, and the like, and mixtures thereof. The more preferred emulsifying agent is selected from the group consisting of acetylated monoglycerides (Cetodan-700) and fatty acid monoglycerides (Dimodan-PVK). A most preferred emulsifying agent is Myverol 1892.

The amount of emulsifying agent present in the reduced-fat composition of the present invention is an effective amount. An effective amount of emulsifying agent is that amount of emulsifying agent necessary to help prevent separation of the phases during storage. In a preferred embodiment, the emulsifying agent will be present in the reduced-fat composition in an amount from about 0.01% to about 5%, preferably from about 0.02% to about 2%, and more preferably from about 0.05% to about 1.5%, by weight.

The hygroscopic proteins complexed by the protein complexing agents of the present invention may be any edible hygroscopic protein. Nonlimiting examples of hygroscopic proteins may be selected from the group consisting of dairy (milk protein, egg protein), vegetable (soy bean protein, wheat protein, corn protein, rice protein, oat protein, peanut protein, leguminous protein), meat, and fish proteins.

Examples of dairy protein include milk and egg protein. The term "milk protein" as used herein refers to proteins present or derived from milk. Milk proteins include proteins derived from whole milk, reduced-fat milk, non-fat milk, buttermilk, powdered milk, and the like. The main proteins found in milk are casein, present in an amount of about 80%, and whey proteins which are beta-lactoglobulin or lactalbumin, present in an amount of about 20%.

The term "egg protein" as used herein is used in its common meaning and refers to proteins present or derived from egg. Egg proteins include proteins derived from egg white, dried egg white, and the like. The main protein found in egg is ovalbumin (egg white).

Examples of vegetable protein include soy bean, wheat (such as semolina), corn, rice, oat, peanut, and legume protein. The term "vegetable protein" as used herein is used in its common meaning and refers to proteins present or derived from the vegetable, meal, oil meal, flour, and the like. The term "legume" refers to the pod or fruit of a leguminous plant, such as peas or beans. A preferred vegetable protein is semolina.

The term "peanut protein" as used herein is used in its common meaning and refers to proteins present or derived from peanuts, peanut meats, peanut oil meal, and the like. Peanuts contain about 26% protein and peanut oil meal contains from about 39% to about 45% protein. The main proteins found in peanuts are the globulins, arachin, and conarachin.

Examples of meat protein include bovine, porcine, and lamb protein. The term "meat protein" as used herein is used in its common meaning and refers to proteins present or derived from animal meats.

Examples of fish protein include cod, halibut, haddock, as well as fish protein concentrate. The term "fish protein" as used herein is used in its common meaning and refers to proteins present or derived from fish meats.

The present invention extends to methods for making the improved reduced-fat compositions comprising a protein complexing agent. In a typical method, the reduced-fat compositions are prepared by admixing the oil phase and the premixed aqueous phase. The components may be admixed using standard techniques and apparatus known to those skilled in the art. Other ingredients will usually be incorporated into the composition as dictated by the nature of the desired composition as well known by those having ordinary skill in the art. The ultimate protein compositions are readily prepared using methods generally known in the food technology and confectionery arts.

In a specific embodiment, the present invention is directed to a method for preparing a reduced-fat composition in the form of an emulsion which comprises the steps of:

(A) forming an aqueous phase present in an amount from about 1% to about 99%, wherein the aqueous phase comprises a protein complexing agent present in an amount from about 0.2% to about 98%, in percentages by weight; and (B) admixing the aqueous phase from step (A) with an oil phase comprising an edible fat or oil present in an amount from about 1% to about 99%, in percentages by weight, to form the reduced-fat composition.

The present invention extends to methods for using the improved reduced-fat compositions comprising a protein complexing agent. In a typical method, the reduced-fat compositions are employed by admixing the inventive compositions with the hygroscopic protein in the cereal or flour portion of the baking food. The components may be admixed using standard techniques and apparatus known to those skilled in the art.

In a specific embodiment, the present invention is directed to a method for reducing the hygroscopic properties of a protein which comprises contacting a hygroscopic protein with a reduced-fat composition in the form of an emulsion, wherein the reduced-fat composition comprises:

(A) an oil phase comprising an edible fat or oil present in an amount from about 1% to about 99%; and (B) an aqueous phase present in an amount from about 1% to about 99%, wherein the aqueous phase comprises a protein complexing agent present in an amount from about 0.2% to about 98%.

Once prepared, the reduced-hygroscopic protein compositions may be used directly, may be stored for future use, or may be formulated in effective amounts with conventional edible carriers to prepare a wide variety of edible compositions such as cookies, cakes, pies, candies, chocolates, butters, jellies, jams, sauces, and the like.

In another embodiment, the present invention pertains to a method for reducing the hygroscopic properties of a protein which comprises contacting a hygroscopic protein with an effective amount of a protein complexing agent to reduce the hygroscopic properties of the protein.

The amount of the protein complexing agent present in this method of the present invention is an effective amount. An effective amount of protein complexing agent is that amount of protein complexing agent necessary to reduce the hygroscopic properties of the protein. In a preferred embodiment, the protein complexing will be present in an amount from about 0.2% to about 92%, preferably from about 0.5% to about 50%, and more preferably from about 0.6% to about 13%, by weight.

In yet another embodiment, the present invention is directed to a delivery system for reducing the hygroscopic properties of a protein which comprises (a) a protein complexing agent to reduce the hygroscopic properties of a protein present in an amount from about 0.2% to about 99%, preferably from about 0.5% to about 50%, and more preferably from about 0.6% to about 13%, by weight, and (b) an edible carrier.

The protein complexing agents which may be employed in the delivery systems of the present invention have been set out above. The amount of protein complexing agent present in the delivery system of the present invention is an effective amount. An effective amount of protein complexing agent is that amount of protein complexing agent necessary to reduce the hygroscopic properties of the protein. The exact amount of protein complexing agent employed is subject to such factors as the type of protein complexing agent used in the mixture, the hygroscopic protein to be complexed, the other ingredients in the composition, and the type of final product desired. The exact amount of protein complexing agent employed may be varied in order to obtain the result desired in the final product and such variations are within the capabilities of those skilled in the art without the need for undue experimentation. In a preferred embodiment, the protein complexing agent will be present in the reduced-fat composition in an amount from about 0.2% to about 99%, preferably from about 0.5% to about 80%, and more preferably from about 1% to about 50%, by weight.

Suitable edible carriers and confectionery bulking agents for use in the delivery systems of the present invention include sweetening agents selected from the group consisting of, but not limited to, monosaccharides, disaccharides, polysaccharides, sugar alcohols, and mixtures thereof; randomly bonded glucose polymers such as those polymers distributed under the tradename POLYDEXTROSE by Pfizer, Inc., Groton, Conn.; isomalt (a racemic mixture of alpha-D-glucopyranosyl-1,6-mannitol and alpha-D-glucopyranosyl-1,6-sorbitol manufactured under the tradename PALATINIT by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses, and the like, and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Di-Pac, which is a co-crystallization mixture of 97% sucrose and 3% highly modified dextrines, may also be employed. Di-Pac and mixtures of sucrose and corn syrup solids may also be employed.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, water-soluble sugar alcohol useful as a bulking agent in the preparation of beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

Suitable hydrogenated starch hydrolysates include those disclosed in U.S. Pat. Nos. Re. 25,959, 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN, a commercially available product manufactured by Roquette Freres of France, and HYSTAR, a commercially available product manufactured by Lonza, Inc., of Fairlawn, N.J., are also useful.

A variety of traditional ingredients may be optionally included in effective amounts in the delivery systems of the present invention. Such ingredients include antioxidants, preservatives, and the like. Suitable anti-oxidants include butylated hydroxytoluene (BHT), butylated hydroxyanisole (BHA), propyl gallate, and mixtures thereof. Suitable preservatives include potassium sorbate, sodium benzoate, calcium propionate, and mixtures thereof. Other conventional additives known to one having ordinary skill in the food and confectionery art may also be used in the edible composition.

A general discussion of the composition and preparation of confections may be found in B. W. Minifie, *Chocolate, Cocoa and Confectionery: Science and Technology*, 2nd edition, AVI Publishing Co., Inc., Westport, Conn. (1980), at pages 424–425, which disclosure is incorporated herein by reference.

The present invention extends to methods for making the delivery systems. In such a method, a delivery system is made by mixing a protein complexing agent and an edible carrier. The protein complexing agent may be admixed with the edible carrier in any conventional manner such as by preparing a homogeneous mixture of the components. Other ingredients will usually be incorporated into the composition as dictated by the nature of the desired composition as well known by those having ordinary skill in the art. The ultimate edible compositions are readily prepared using methods and apparatus generally known in the food technology arts.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLE 1

This example demonstrates the preparation of a reduced-fat (50%) baking oil prepared according to the present invention. This example also demonstrates a comparision of the use of a reduced-fat (50%) baking oil prepared according to the present invention versus a full-fat oil in baking a cake.

| Component | % amount by weight |
|---|---|
| Low D.E. Maltodextrins | 18.0 |
| Calcium Gluconate | 3.24 |
| Ascorbic Acid | 0.36 |
| Water | 28.40 |
| Vegetable Oil | 50.0 |
| Total | 100.00 |

The dry powders were added to the water and the mixture was heated to 185° F. with stirring. The mixture was then cooled to 120° F. and vegetable oil was slowly added to the cooled aqueous phase with blending at high speed. The product formed an oil-in-water emulsion (white and creamy) which separated in 3 or 4 days but re-dispersed on shaking. Later addition of an oil-in-water emulsifier such as Tween 60 prevented the separation problem.

Two cakes were then prepared using the ingredients, water and eggs, and directions provided on a Pillsbury devils food cake mix box. The first cake was prepared with regular vegetable oil (Control Sample), as directed on the cake mix box. The second cake was prepared using the above reduced-fat (50%) baking oil with a protein complexing agent prepared above (Test Sample).

The Control Sample and Test Sample cakes were baked and cooled. The Test Sample (reduced-fat) had a better appearance (better rise, less shrink, no doming, more even crown, and no cracking on the top) and a more tender melt in the mouth texture and a cleaner chocolate taste than the Control Sample. This Control Sample and Test Sample comparison was repeated several times with the same manufacturers cake mix, and with other manufacturers cake mix, and the same results were obtained.

EXAMPLE 2

This example demonstrates the preparation of a reduced-fat (49.5%) baking margarine prepared according to the present invention. This example also demonstrates a comparision of the use of a reduced-fat (49.5%) baking margarine prepared according to the present invention versus a full-fat oil in baking a cake.

| Component | % amount by weight |
|---|---|
| Low D.E. Maltodextrins | 18.1 |
| Calcium Gluconate | 3.25 |
| Ascorbic Acid | 0.35 |
| Water | 16.40 |
| Myverol 1892 | 0.10 |
| Margarine | 61.8 |
| Total | 100.00 |

The dry powders were added to the water and heated with stirring to 185° F. This mixture was then cooled to 120° F. The Myverol 1892 was melted and added to a small amount of the margarine in a melted state. This Myverol 1892 melted margarine mixture was added to the rest of the margarine in a blender and dispersed. The 120° F. aqueous phase was then added to the margarine and blended to homogeneity. The mixture in the blender was then cooled (70°–77° F.) and poured in a semi-liquid state into containers which were then refrigerated.

Two cakes were then prepared using the ingredients, water and eggs, and directions provided on a Pillsbury devils food cake mix box. The first cake was prepared with regular vegetable oil (Control Sample), as directed on the cake mix box. The second cake was prepared using the above reduced-fat (49.5%) margarine with a protein complexing agent prepared above (Test Sample).

The Control Sample and Test Sample cakes were baked and cooled. The Test Sample was more moist, more tender, looked better (better rise, no cracking, and less shrink) and had a brighter flavor. The Control Sample was also good but it had a heavier oily mouth feel and was a little gummy. These differences between the Control Sample and Test Sample cakes became greater over the shelf life of the cakes (5 days). By the second day, the Control Sample (vegetable oil) cake was oily and gummy as compared to the more tender "melt in the mouth" texture of the Test Sample. By day 5, the Test Sample was definitely more moist and tender than the Control Sample. In summary, the reduced-fat (49.5%) margarine comprising a protein complexing agent and maltodextrins can be substituted for the oil called for on the boxes of commercial cake mixes to make fat-reduced cakes that are better than or equivalent to the cake made with the full fat ingredient.

EXAMPLE 3

This example demonstrates the preparation of a reduced-fat (49%) baking butter prepared according to the present invention. This example also demonstrates a comparison of the use of a reduced-fat (49%) baking butter prepared according to the present invention versus a full-fat oil in baking a cake. This example also demonstrates a comparison of the use of a reduced-fat (49%) baking butter prepared according to the present invention versus a conventional reduced-fat butter blend in baking a cake

| Component | % amount by weight |
|---|---|
| Low D.E. Maltodextrins | 18.1 |
| Calcium Gluconate | 3.25 |
| Ascorbic Acid | 0.35 |
| Water | 16.40 |
| Myverol 1892 | 0.10 |
| Butter | 61.8 |
| Total | 100.00 |

The dry powders were added to the water and heated with stirring to 185° F. This mixture was then cooled to 120° F. The Myverol 1892 was melted and added to a small amount of melted butter. The rest of the butter was put into a blender and blended with the melted Myverol-butter mixture. The 120° F. aqueous phase was then added to the pre-blended Myverol-butter mixture and blended to homogeneity. The mixture in the blender was then cooled to solidify the product (70°–77° F.) and poured in a semi-liquid state into containers and refrigerated.

Two cakes were then prepared using the ingredients, water and eggs, and directions provided on a Pillsbury devils food cake mix box. The first cake was prepared with regular vegetable oil (Control Sample), as directed on the cake mix box. The second cake was prepared using the above reduced-fat (49%) butter with a protein complexing agent prepared above (Test Sample).

The Control Sample and Test Sample cakes were baked and cooled. The Test Sample cake looked much better than the Control Sample (better rise, no shrinkage, no air holes, and more uniform crown on top of the cake). The Test Sample cake tasted more moist and tender than the Control Sample. The taste and texture differences increased between the Control Sample and Test Sample cakes on the 2nd and 3rd day.

A comparison of cakes prepared with conventional reduced-fat butter blends, without a protein complexing agent and maltodextrins, versus cakes prepared with the reduced-fat butter composition prepared above showed that the fat portion of the reduced-fat blend with a protein complexing agent and maltodextrins is important to give the most desirable result. Satisfactory results cannot be obtained when using conventional reduced-fat butter blends because although the cakes rise well in the oven, the cakes fall when taken from the oven.

EXAMPLE 4

This example demonstrates the preparation of a reduced-fat (44%) baking margarine prepared according to the present invention. This example also demonstrates a comparison of the use of a reduced-fat (44%) baking margarine prepared according to the present invention versus a full-fat margarine in baking a cake.

| Component | % amount by weight |
|---|---|
| Low D.E. Maltodextrins | 20.6 |
| Calcium Gluconate | 5.4 |
| Sodium Ascorbate | 0.6 |
| Water | 17.20 |
| Salt | 0.60 |
| Myverol 1892 | 0.10 |
| 40% Potassium Sorbate Sol. | 0.10 |
| Margarine | 55.4 |
| Total | 100.00 |

The dry powders were added to the water and heated with stirring to 185° F. The Myverol 1892 and a small amount of the margarine were melted together. This melted mixture was added to the rest of the margarine in a blender with mixing. The aqueous phase was then cooled to 120° F. and added to the blender. The mass was blended to homogeneity. The mixture was then cooled to solidify the product (70°–77° F.), poured into containers in a semi-liquid state, and refrigerated.

Two cakes were then prepared using the ingredients, water and eggs, and directions provided on a Pillsbury devils food cake mix box. The first cake was prepared with full fat margarine (Control Sample) rather than regular vegetable oil, as directed on the cake mix box. The second cake was prepared using the above reduced-fat (44%) margarine with a protein complexing agent prepared above (Test Sample).

The baked cakes were compared after cooling. The Test Sample cake looked better (shrank less, more even rise, no air holes), had a more tender texture, and was equivalent to the Control Sample cake in flavor. As the cakes aged, the Test Sample cake seemed to dry more slowly (On Day 2 and 3) than the Control Sample cake. By the end of the second day, the Control Sample cake was starting to get gummy while the Test Sample cake stayed moist and tender through day 3 and 4.

EXAMPLE 5

This example demonstrates the preparation of a reduced-fat (49%) shortening prepared according to the present invention. This example also demonstrates a comparison of the use of a reduced-fat (49%) shortening prepared according to the present invention versus a full-fat shortening in baking a cake, cookies, and making a pie crust.

| Component | % amount by weight |
|---|---|
| Calcium Gluconate | 5.4 |
| Ascorbic Acid | 0.6 |
| Water | 16.0 |
| Low D.E. Maltodextrins | 26.2 |
| 40% Potassium Sorbate Sol. | 0.3 |
| Myverol | 0.1 |
| Salt | 0.5 |
| Sugar | 2.0 |
| Shortening | 48.9 |
| Total | 100.00 |

The dry powders were added to the water and heated with stirring to 185° F. The Myverol 1892 was melted and added to a small amount of the shortening in a melted state. This Myverol 1892 melted shortening mixture was added to the rest of the shortening in a blender and dispersed. This mixture was then cooled to 120° F. The 120° F. aqueous phase was then added to the shortening and blended to homogeneity. The mixture in the blender was then cooled (70°–77° F.) and poured in a semi-liquid state into containers which were then refrigerated.

Two cakes were then prepared using the ingredients, water and eggs, and directions provided on a Pillsbury devils food cake mix box. The first cake was prepared with regular shortening (Control Sample), as directed on the cake mix box. The second cake was prepared using the above reduced-fat (49%) shortening with a protein complexing agent prepared above (Test Sample).

The Control Sample and Test Sample cakes were baked and cooled. The Test Sample cake was equivalent to the Control Sample cake.

Test Sample pie crust and Test Sample cookies were also made with the reduced-fat (49%) shortening and were found to be equivalent to the full-fat shortening Control Sample.

EXAMPLE 6

This example demonstrates a comparision of the use of a reduced-fat (44%) baking margarine comprising a protein complexing agent and maltodextrins according to the present invention versus a conventional reduced-fat margarine without a protein complexing agent in baking a pie.

| Component | % amount by weight |
|---|---|
| Reduced-fat Margarine | 35.0 |
| Flour | 56.6 |
| Salt | 0.8 |
| Sugar | 0.8 |
| Water | 6.8 |
| Total | 100.00 |

The reduced-fat margarine was chilled in the freezer for 40 minutes and then blended with a pastry blender into a preblended mixture of flour, salt, and sugar until the pieces of reduced-fat margarine were pea size or smaller. The mixture was then chilled in a refrigerator. Cold water was then added by the teaspoon to the mixture while tossing the mixture with a fork until it began to ball-up. The mixture was then kneaded into two balls by hand and chilled in a refrigerator. After being chilled, each ball of mixture was flattened and rolled-out with a floured rolling pin on a floured surface. The crust rolled easily, did not stick to the rolling pin, and did not shrink back after rolling. A bottom crust was made from one ball and a top crust was made from the other ball. The crusts were put into a pie dish with apple filling, the edges were crimped with a fork, and the pie was baked at 450° F. for 15 minutes, then at 380° F. for 35 minutes. The Test Sample pie looked very good when it came out of the oven.

After being cooled, the Test Sample pie was evaluated. The Test Sample pie was very good. The bottom crust, under the apple filling, was not soggy and the top crust was flaky. After one day, the top crust of the Test Sample pie was still flaky and the bottom crust was not soggy. In fact, the bottom crust was crisp enough so that a piece of pie could be held in hand without breaking. The second day, the Test Sample pie was still as described above. On the 3rd and last day of the test, the Test Sample pie was still very good. The top crust was flaky and the bottom crust was not soggy. Even the crust on the perimeter of the Test Sample pie, where the upper and lower crust join, was still flaky and not stale. These positive test results were obtained with a pie crust that contained 15% fat, approximately 50% of the fat contained in a normal pie crust (normal pie crust is 30–33% fat).

A Control Sample pie crust was made with a reduced-fat margarine (commercial) with no protein complexing system. The Control Sample mixture was very soft, would not sheet, and stuck to the rolling pin and the floured surface.

EXAMPLE 7

This example demonstrates the preparation of sugar cookies using the reduced-fat (44%) baking margarine prepared with protein complexing agents and maltodextrins according to the present invention.

| Component | % amount by weight |
|---|---|
| Reduced-fat Margarine | 25.00 |
| Sugar | 27.20 |
| Eggs | 8.40 |
| Vanilla Extract | 1.10 |
| All purpose flour | 37.90 |
| Baking Powder | 0.26 |
| Salt | 0.14 |
| Total | 100.00 |

The sugar was blended with a beater into the reduced-fat margarine followed by the eggs and vanilla extract. A premix of flour, salt, and baking powder was then blended into the above mixture. The above mixture was then chilled in a refrigerator for at least three hours. The cookie mix was then rolled out to a ¼ inch thickness and cut to desired shapes. The cookies were then baked at 375° F. for 10 minutes.

After cooling, the cookies were evaluated and were rated as very good to excellent. These Test Sample cookies had a 10–11% fat content compared to Control Sample cookies which have a 17% fat content.

EXAMPLE 8

This example demonstrates the foam depressing properties of the reduced-fat (44%) margarines prepared according to the method of the present invention versus conventional margarine.

Two sauce mixes were prepared using McCormick's Pasta Primavera powdered sauce mix (ingredients-parrmesan, romano cheeses, dehydrated butter, modified corn starch, nonfat dry milk, salt, dry buttermilk, partially hydrogenated soybean oil, onion, spices, garlic, disodium phosphate, citric acid, and BHA) with the directions provided on the box. The first sauce was prepared with regular margarine (Control Sample), as directed on the mix box. The second sauce was prepared using the above reduced-fat (44%) margarine with a protein complexing agent prepared above (Test Sample). In each case, three tablespoons of margarine and ¾ cup of milk were added. After melting the margarine, the mixture was mixed well and brought to a boil. The heat was then reduced and the mixtures simmered for 5 minutes. The Test Sample sauce made with the reduced-fat blend comprising the protein complexing system generated practically no foam on boiling. The Control Sample sauce made with normal margarine foamed badly.

EXAMPLE 9

This example demonstrates the foam depressing properties of the reduced-fat (44%) butter prepared according to the method of the present invention versus conventional butter.

Two sauce mixes were prepared using McCormick's powdered cheddar cheese sauce with the directions provided on the box. The first sauce was prepared with regular butter (Control Sample), as directed on the mix box. The second sauce was prepared using the above reduced-fat (44%) butter with a protein complexing agent prepared above (Test Sample). In each case, 1 cup of milk was added to each sauce pan to disperse the dry mix and butter as it was heated over a low flame. The Control Sample sauce (regular butter) foamed over the top of the sauce pan in 1½ to 2 minutes. The Test Sample sauce (reduced-fat (44%) butter with protein complexing agents) did not foam even though it was boiled for 5 minutes. The Control Sample sauce resulted in a thin cheese sauce. The Test Sample sauce resulted in a thick, creamy sauce.

The embodiments of the present invention described herein are merely exemplary and are not intended to limit the scope of the invention. Many variations and modifications may be made without departing from the spirit and scope of the invention. Applicants intend that all such modifications and variations are to be included within the scope of the invention as defined in the appended claims and their equivalents.

We claim:

1. A reduced-fat composition in the form of an emulsion which comprises in percentages by weight of the total composition:
   (A) an oil phase comprising an edible fat or oil present in an amount from about 1% to about 99%; and
   (B) an aqueous phase present in an amount from about 1% to about 99%, wherein the aqueous phase comprises a protein complexing agent present in an amount from about 0.6% to about 13%.

2. The reduced-fat composition according to claim 1, wherein the edible fat or oil is selected from the group consisting of liquid partially hydrogenated, fully hydrogenated, and interesterified vegetable oils, animal fats, marine oils, and fatty acids esterified with non-fat materials.

3. The reduced-fat composition according to claim 2, wherein the edible fat or oil is selected from the group consisting of vegetable oils and animal fats.

4. The reduced-fat composition according to claim 1, wherein the edible fat or oil is present in an amount from about 2% to about 85%.

5. The reduced-fat composition according to claim 1, wherein the protein complexing agent is selected from the group consisting of non-toxic water-soluble calcium compounds and magnesium compounds.

6. The reduced-fat composition according to claim 5, wherein the protein complexing agent is calcium gluconate.

7. The reduced-fat composition according to claim 1, further comprising a water-soluble solid present in an amount from about 2% to about 75%.

8. The reduced-fat composition according to claim 7, wherein the water-soluble solid is present in an amount from about 5% to about 50%.

9. The reduced-fat composition according to claim 7, wherein the water-soluble solid is selected from the group consisting of starches, dextrose, sucrose, fructose, low dextrose equivalence maltodextrins, corn syrup solids, lactose, acacias, guar, karaya, polydextrose, microcrystalline cellulose, methyl cellulose, and mixtures thereof.

10. The reduced-fat composition according to claim 9, wherein the water-soluble solid is low dextrose equivalence maltodextrins.

11. The reduced-fat composition according to claim 1, further comprising an emulsifying agent.

12. The reduced-fat composition according to claim 11, wherein the emulsifying agent is present in an amount from about 0.01% to about 5%.

13. The reduced-fat composition according to claim 1, wherein the reduced-fat composition is selected from the group consisting of butter, margarine, and shortening.

14. A method for preparing a reduced-fat composition in the form of an emulsion which comprises the steps of:
   (A) forming an aqueous phase present in an amount from about 1% to about 99%, wherein the aqueous phase comprises a protein complexing agent present in an amount from about 0.6% to about 13%, in percentages by weight; and
   (B) admixing the aqueous phase from step (A) with an oil phase comprising an edible fat or oil present in an amount from about 1% to about 99%, in percentages by weight, to form the reduced-fat composition.

15. A method for reducing the hygroscopic properties of a protein which comprises contacting a hygroscopic protein with a reduced-fat composition in the form of an emulsion, wherein the reduced-fat composition comprises:
   (A) an oil phase comprising an edible fat or oil present in an amount from about 1% to about 99%; and
   (B) an aqueous phase present in an amount from about 1% to about 99%, wherein the aqueous phase comprises a protein complexing agent present in an amount from about 0.6% to about 13%.

16. A method for reducing the hygroscopic properties of a protein which comprises contacting a hygroscopic protein with an effective amount of a protein complexing agent to reduce the hygroscopic properties of the protein.

17. The method according to claim 16, wherein the hygroscopic protein is selected from the group consisting of milk protein, egg protein, wheat protein, corn protein, rice protein, oat protein, leguminous protein, meat protein, and fish protein.

18. The method according to claim 16, wherein the protein complexing agent is selected from the group consisting of non-toxic water-soluble calcium compounds and magnesium compounds.

19. The method according to claim 18, wherein the protein complexing agent is calcium gluconate.

20. The method according to claim 16, wherein the protein complexing agent is present in an amount from about 0.2% to about 92%, by weight.

21. A delivery system for reducing the hygroscopic properties of a protein which comprises (a) a protein complexing agent to reduce the hygroscopic properties of a protein present in an amount from about 0.6% to about 13%, by weight, and (b) an edible carrier.

22. The delivery system according to claim 21, wherein the protein complexing agent is selected from the group consisting of non-toxic water-soluble calcium compounds and magnesium compounds.

23. The delivery system according to claim 22, wherein the protein complexing agent is calcium gluconate.

24. The delivery system according to claim 21, wherein the edible carrier is a carbohydrate selected from the group consisting of corn syrup solids, maltodextrins, starches, sugars, natural fibers, and cellulose derivatives.

* * * * *